United States Patent [19]

Hata et al.

[11] Patent Number: 5,254,847
[45] Date of Patent: Oct. 19, 1993

[54] CONTACT-TYPE IMAGE SENSOR ASSEMBLY HAVING SUPPORTING STRUCTURE FOR MAINTAINING PREDETERMINED DISTANCE BETWEEN THE LENS AND THE ORIGINAL AND THE SENSOR

[75] Inventors: Fumio Hata, Tokyo; Kenji Nagata, Kawasaki, both of Japan

[73] Assignee: Canon Kabushiki Kaisha, Tokyo, Japan

[21] Appl. No.: 863,762

[22] Filed: Apr. 6, 1992

[30] Foreign Application Priority Data

Apr. 8, 1991 [JP] Japan ................. 3-074906

[51] Int. Cl.$^5$ .................. H01J 40/14; H01J 5/02
[52] U.S. Cl. .................. 250/208.1; 250/239
[58] Field of Search .................. 250/208.1, 239; 358/482, 483, 484, 493, 494, 496–497; 357/74, 30 H; 257/432–434

[56] References Cited

U.S. PATENT DOCUMENTS

| | | | |
|---|---|---|---|
| 4,457,017 | 6/1984 | Onogi et al. | 250/208.1 |
| 4,461,956 | 7/1984 | Hatanaka et al. | 250/578 |
| 4,581,657 | 4/1986 | Takano | 358/482 |
| 4,644,411 | 2/1987 | Sato et al. | 250/208.1 |
| 4,675,534 | 6/1987 | Sekimura et al. | 358/482 |
| 4,680,644 | 7/1987 | Shirato et al. | 358/294 |
| 4,686,554 | 8/1987 | Ohmi et al. | 357/30 |
| 4,723,129 | 2/1988 | Endo et al. | 346/1.1 |
| 4,724,323 | 2/1988 | Fukaya et al. | 250/370 |
| 4,733,098 | 3/1988 | Seito et al. | 250/578 |
| 4,737,654 | 4/1988 | Morishita et al. | 290/48 |
| 4,740,796 | 4/1988 | Endo et al. | 346/1.1 |
| 4,763,189 | 8/1988 | Komatsu et al. | 358/75 |
| 4,791,469 | 12/1988 | Ohmi et al. | 357/30 |
| 4,791,493 | 12/1988 | Ogura et al. | 358/294 |
| 4,810,896 | 3/1989 | Tanaka et al. | 250/578 |
| 4,886,977 | 12/1989 | Gofuku et al. | 250/578 |
| 4,920,431 | 4/1990 | Ogura et al. | 358/496 |
| 4,924,282 | 5/1990 | Komiyama et al. | 357/30 |
| 4,982,079 | 1/1991 | Yagyu | 250/208 |
| 4,990,764 | 2/1991 | Yokochi et al. | 358/471 |
| 5,052,776 | 10/1991 | Fukushima et al. | 250/208.1 |
| 5,068,523 | 11/1991 | Adelson | 250/208.1 |

FOREIGN PATENT DOCUMENTS 60-230616 11/1985 Japan.
61-25360 2/1986 Japan.
61-25362 2/1986 Japan.

*Primary Examiner*—David C. Nelms
*Assistant Examiner*—Michael Messinger
*Attorney, Agent, or Firm*—Fitzpatrick, Cella, Harper & Scinto

[57] ABSTRACT

A contact-type image sensor assembly including: an image sensor; a light source for illuminating an original document which has image information; an optical lens for imaging light reflected by the original document onto the image sensor; and a supporting member for supporting the image sensor, the light source and the optical lens, wherein the supporting member includes: a first supporting member for maintaining the distance from the surface of the original document and the light incidental side of the optical lens at a predetermined distance; a second supporting member disposed individually from the first supporting member and acting to maintain the distance from the light emission side of the optical lens to the light receiving side of the image sensor; and a third supporting member for supporting the first and second supporting members at predetermined positions and the third supporting member supports the first and second supporting members in this way that their positions can be adjusted.

21 Claims, 6 Drawing Sheets

CONTACT-TYPE IMAGE SENSOR ASSEMBLY HAVING SUPPORTING STRUCTURE FOR MAINTAINING PREDETERMINED DISTANCE BETWEEN THE LENS AND THE ORIGINAL AND THE SENSOR

BACKGROUND OF THE INVENTION

1. Field of the Invention

The present invention relates to a contact-type image sensor assembly, and, more particularly to a contact-type image sensor assembly for projecting an image of an original document on an image sensor via an imaging lens.

2. Related Background Art

Image sensors for equipment such as facsimile machines and image scanners for use to input images are classified into contraction-type image sensors which contract the image of an original document to be read so as to project it on the sensor and equal-magnification-type image sensors which have an optical system of a 1:1 image focusing type and receiver an image having the same dimension as that of the original document, that is, the same width. An equal-magnification-type image sensor further may have a structure which includes an image focusing lens or may be of a closed contact type which does not include it. Examples of an image sensor which includes an equal magnification imaging lens have been disclosed in Japanese Patent Laid-Open No. 60-230616, Japanese Patent Laid-Open No. 61-25360, Japanese Patent Laid-Open No. 61-25362, U.S. Pat. No. 4,737,654, U.S. Pat. No. 4,724,323, U.S. Pat. No. 4,763,189, U.S. Pat. No. 4,680,644, U.S. Pat. No. 4,920,431, U.S. Pat. No. 4,733,098 and U.S. Pat. No. 4,791,493.

Examples of a closed contact-type image sensor have been disclosed in U.S. Pat. No. 4,924,282, U.S. Pat. No. 4,886,977 and U.S. Pat. No. 4,982,079.

FIG. 1 illustrates an example which uses an equal magnification imaging lens represented by a Selfoc Lens Array (trade name which will be hereinafter called an "SLA") manufactured by Nippon Sheet Glass Co., Ltd. Referring to FIG. 1, reference numeral 1 represents a semiconductor line sensor, 2 represents the aforesaid SLA, 3 represents an LED array for illuminating an original document 5, 4 represents a protection glass on which the original document is placed while being brought into contact with the same, 6 represents a case in which the aforesaid elements are integrally accommodated as a unit and 8 represents a cover for the case 6. Usually, the focal points of the optical system and the other electric characteristics are adjusted in a state where the line sensor 1, the SLA 2, and the LED array 3, and the like, are assembled in the case 6 before delivery to a market as a unit.

Next, the focal point adjustment operation will now be described.

The focal point adjustment operation and the like are performed by vertically moving the SLA 2 by a small quantity. Reference numeral 9 represents a setting screw for securing the SLA 2 to a support wall 6D of the case 6 while pressing the SLA 2 to the support wall 6D after the focal point has been adjusted. The focal point is, as shown in FIG. 2, adjusted by setting a chart (which usually is a white and black stripe chart) 10 for adjusting a lens on the protection glass 4 at a position on which the original document will be placed. Then, the front portion of a focal point adjusting screw 12 is brought into contact with the SLA 2 which is elastically supported by a leaf spring 11 toward a supporting wall 6D, and the SLA 2 is vertically moved by a small quantity while operating the screw 12. Thus, an output obtained from a line sensor (omitted from illustration) is observed by an oscilloscope or the like and the SLA 2 is secured by the setting screw 9 at the moment at which the optimum focal point adjustment is secured. In order to further reliably secure it, an adhesive agent may be used.

Then, the reason why the focal point adjustment must be performed will now be described with reference to FIGS. 3A to 3D.

In general, the optical system, which uses the SLA, must be arranged in such a manner that the distance A from an original document surface 5A to the SLA 2 and the distance B from the SLA 2 to a light receiving surface 1A of the line sensor are the same (that is B=A) (where the distance means an optical distance obtained by dividing the mechanical dimension by the refraction factor of the space medium).

In the process of manufacturing the SLA, the conjugate length Tc which is one of the imaging characteristics is maintained at a guaranteed predetermined value by adjusting the length Z in the direction of an optical axis 31 of the SLA 2 (where the length Z is a mechanical dimension). Therefore, the guaranteed value of the dimension Z of the SLA 2 supplied from an SLA manufacturer is allowed to have a tolerance ΔZ of, for example, about ±0.33 mm. However, if the position of the SLA 2 is, as show in FIG. 3B, deviated from the center of the distance between the original document surface 5A and the light receiving surface 1A of the line sensor 1 while maintaining the relative position between them, the focal point is excessively deviated and the SLA cannot be used practically. Accordingly, it has been necessary to perform a focal-point adjustment operation to, as shown in FIG. 3C, always position the SLA 2 at the optical center between the original document surface 5A and the sensor light receiving surface 1A by realizing a state A'=B' by finely moving the SLA 2 in a direction of the optical axis 31 to change the distance A to A' and change the distance B to B'.

In the contact-type line sensor unit assembly thus adjusted, the original document 5 placed on the protection glass 4 is, as shown in FIG. 1, irradiated with light emitted from the LED array 3 and thereby its image is projected on the line sensor 1 via the SLA 2, so that the original document 5 can be accurately read.

However, it takes an excessively long time to complete the focal-point adjustment operation in the process of assembling the conventional contact-type line sensor assembly, causing the overall cost to be increased excessively.

Furthermore, a gap 12 is formed around the SLA 2 because the SLA 2 must be moved along its supporting wall 6D in the direction of the optical axis for the purpose of adjusting the focal point, causing stray light, which has not passed through the SLA 2, to reach the portion around the line sensor 1 through the gap 12. Therefore, there sometimes arises a problem in that the quality of the image read by the line sensor 1 deteriorates.

In addition, if the SLA 2 is tightened strongly by the setting screw 9 in order to secure the SLA 2 to a predetermined position while withstanding shocks given at the time of transportation or during the operation, another problem takes place in that the SLA 2 will be broken by a concentrated load given through the front portion of the setting screw 9 as shown in FIG. 4.

SUMMARY OF THE INVENTION

Accordingly, an object of the present invention is to overcome the aforesaid problems experienced with the conventional structures by providing an assembly capable of always maintaining the relative positional relationship between a member to be read and the light receiving surface of a line sensor at a state in which focusing is achieved and as well as eliminating a fear of deterioration in the quality of the image due to stray light.

Another object of the present invention is to provide a contact-type image sensor assembly comprising:
an image sensor;
a light source for illuminating an original document which has image information;
an optical lens for imaging light reflected by the original document onto the image sensor; and
a supporting means for supporting the image sensor, the light source and the optical lens, wherein
the supporting member includes:
a first supporting member for maintaining the distance from the surface of the original document and the light incidental side of the optical lens at a predetermined distance;
a second supporting member disposed individually from the first supporting member and acting to maintain the distance from the light emission side of the optical lens to the light receiving side of the image sensor; and
a third supporting member for supporting the first and second supporting members at predetermined positions and
the third supporting member supports the first and second supporting members in this way that their positions can be altered.

Another object of the present invention is to provide a contact-type image sensor assembly comprising:
an image sensor;
a light source for illuminating an original document which has image information;
an optical lens for imaging light reflected by the original document onto the image sensor; and
a supporting member, wherein
the supporting member includes:
a first supporting portion for locating the light incidental side of the optical lens;
a second supporting portion for locating the light emission side of the optical lens; and
a third supporting portion for supporting the first and second supporting portions in this way that the relative position between the first and second supporting portions can be altered.

These and other further objects, features and advantages of the invention will be appear more fully from the following description.

DESCRIPTION OF THE PREFERRED EMBODIMENTS

Preferred embodiments of the present invention will now be described with reference to the drawings. Although the invention has been described in its preferred embodiments, it is understood that the present disclosure of the preferred embodiments may have other details of construction and various combinations and arrangement of parts may be resorted to without departing from the spirit and the scope of the invention as hereinafter claimed.

An embodiment of a contact-type image sensor assembly will now be described which is capable of reading a received image of a subject of the reading operation positioned in contact with the surface of an original-document retainer via an equal magnification imaging lens, the contact-type image sensor being characterized in that: a first supporting member for maintaining the distance from the top surface of the original-document retainer to the surface of the incidental side of the equal magnification imaging lens at a predetermined distance, and a second supporting member positioned in contact with the surface of the emission side of the equal magnification imaging lens and capable of maintaining the distance from the surface of the emission side to the light receiving surface of the line sensor at the aforesaid distance can be integrally coupled to each other while positioning the light receiving surface of the line sensor on the optical axis of the equal magnification imaging lens.

According to this embodiment, if the length of the SLA is changed due to a dimensional error, an image forming relationship can be realized so, and that both the distance from the surface of the original document to the SLA and the distance from the SLA to the light receiving surface of the line sensor are not changed and are always made to be optically the same. Therefore, the necessity of performing the focal point adjustment can be eliminated. Although the distance from the surface of the original document to the light receiving surface (the surface of the line sensor) is changed according to the dimensional error of the SLA, it does not considerably affect the imaging performance. Furthermore, since the dimensional errors of the thickness of the protection glass and the retaining member and the like are sufficiently small (for example, ±0.1 mm or less) as compared with the tolerance of the SLA, it does not affect the imaging performance.

Figure 1:
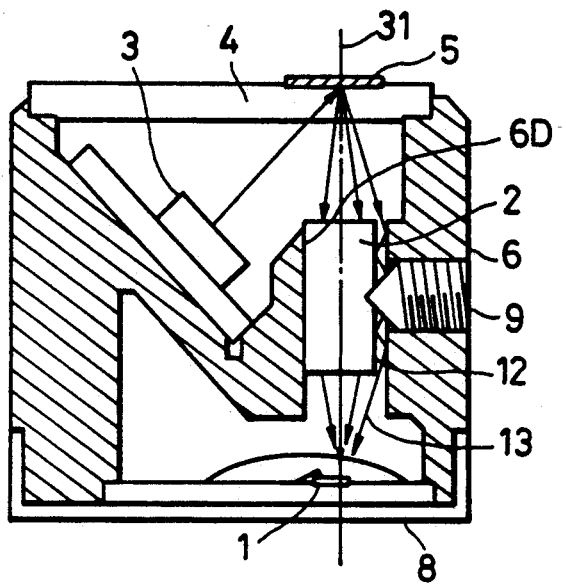
FIG. 1 is a schematic cross sectional view which illustrates a conventional contact-type image sensor.
Figure 2:
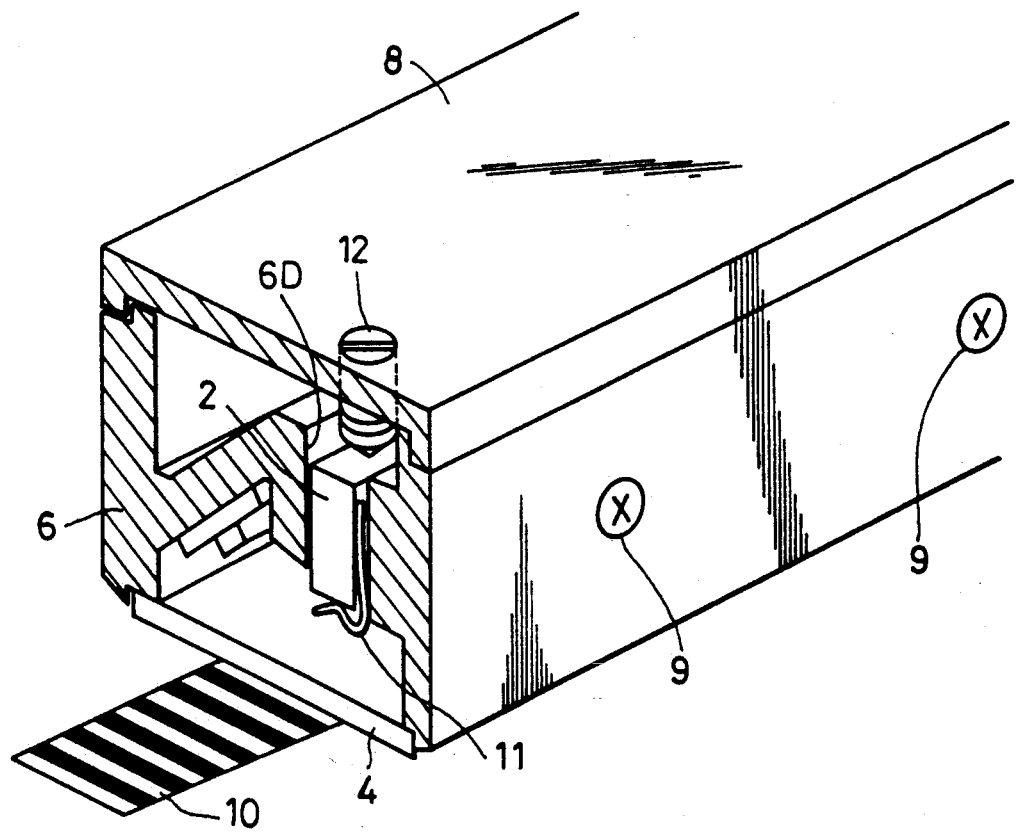
FIG. 2 is a schematic perspective view which illustrates the conventional contact-type image sensor.
Figure 3A:
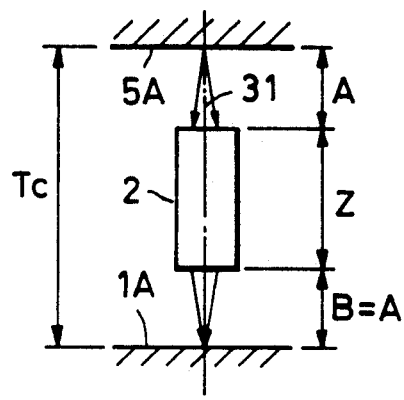
FIGS. 3a, 3b, 3c, and 3d are schematic views which illustrate a method of adjusting a lens of a contact-type image sensor.
Figure 3C:
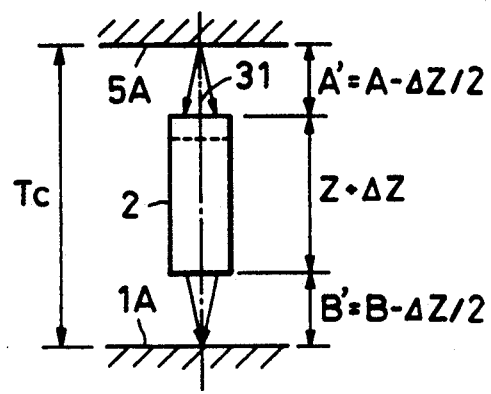
Figure 3B:
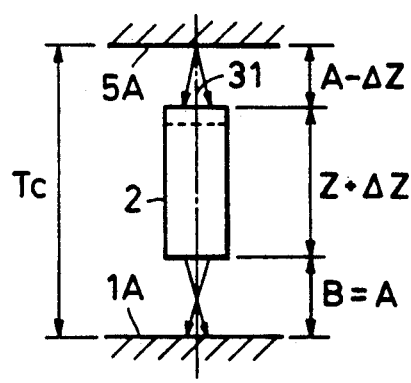
Figure 3D:
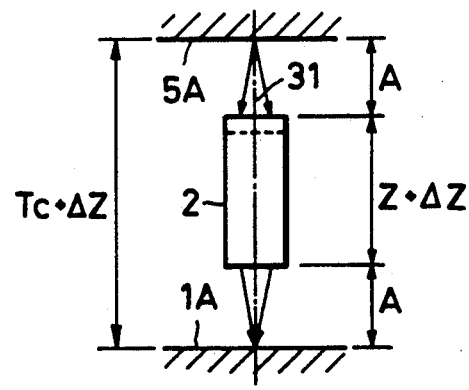
Figure 4:
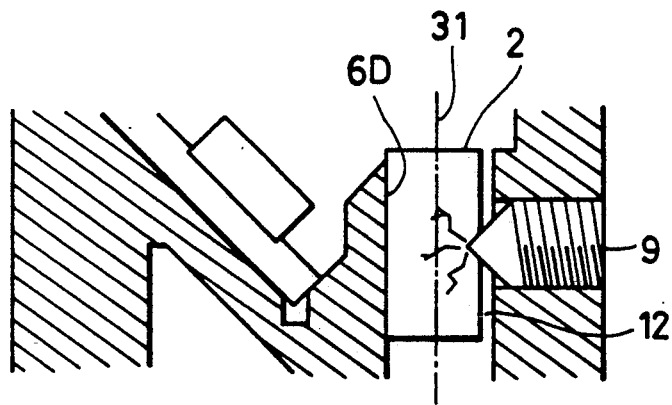
FIG. 4 is a partial enlarged view which illustrates the conventional contact-type image sensor shown in FIG. 1.
Figure 5:
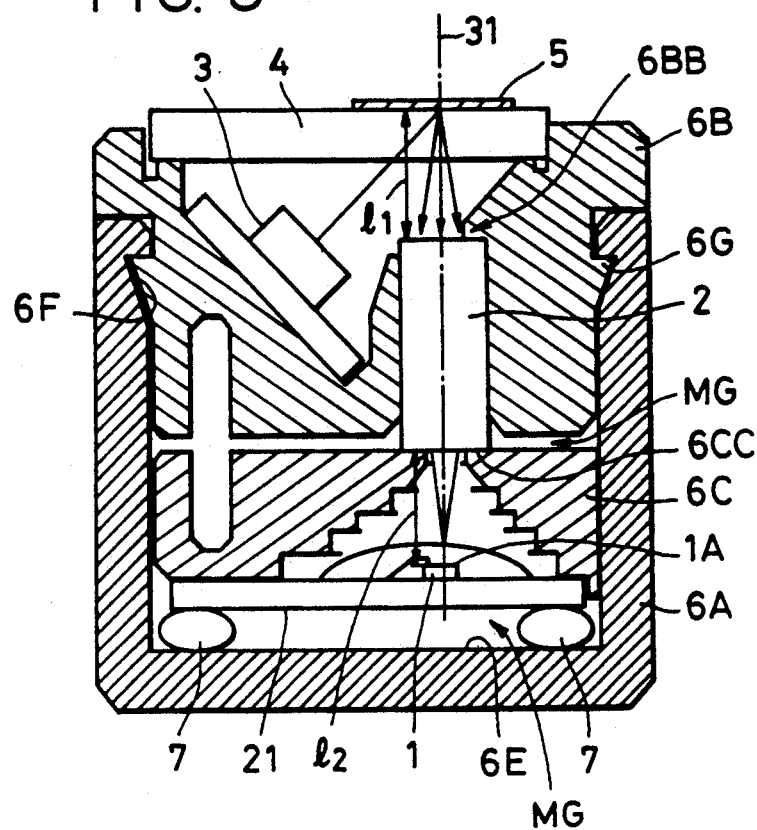
FIG. 5 is a schematic cross sectional view which illustrates an embodiment of a contact-type image sensor according to the present invention.

FIG. 5 illustrates an embodiment of the present invention. Referring to FIG. 5, reference numeral 6B represents a retaining member (hereinafter called an "SLA retaining member") for retaining an SLA 2 in the direction of the optical axis and as well as maintaining the distance $l_1$ from the top surface of the protection glass 4 and the top surface of the SLA 2 at a predetermined distance. Reference numeral 6C represents a member (hereinafter called a "sensor supporting member") for maintaining the distance $l_2$ from the top surface of a line sensor 1 and the lower surface of the SLA 2 at a predetermined distance. Reference numeral 6A represents a case for accommodating the aforesaid elements. Reference numeral 7 represents an elastic member disposed between a supporting frame 21 of the line sensor 1 and a case bottom portion 6E, the elastic member 7 acting to enable the line sensor 1, the sensor supporting member 6C and the SLA 2 to be supported on the surface of the SLA supporting member 6B under the pressure of the supporting frame 21.

The thus arranged contact-type line sensor is assembled in this way that the elastic member 7 is temporarily fastened in the bottom portion 6E of the case 6A. Then, the supporting frame 21 having the line sensor 1, the sensor retaining member 6C, the SLA 2 and the SLA supporting member 6B are, in this sequential order, inserted and placed on the elastic member 7. The case 6A and the SLA supporting member 6B respective have a fastening groove 6F and a fastening claw G which can be fastened to each other so as to strongly press the member 6B to the case 6A, causing the aforesaid two elements to be coupled and integrated with each other by the elasticity of the case 6A. After the aforesaid assembling process has been completed, an LED array 3 and a protection glass 4 are fastened to the member 6B by adhesion or the like and thus the assembling operation is completed.

By employing the contact-type line sensor assembly thus arranged, the required assembling process can be significantly simplified and the complicated focal-point adjustment work taking an excessively long time can be eliminated. Therefore, the assembling cost can be significantly reduced.

Furthermore, a large gap 12 formed between the SLA 2 and the supporting member 6B and that between the SLA 2 and the member 6C and required in the conventional structure can be omitted, causing an effect to be obtained in that the deterioration in the image due to stray light can be prevented.

In addition, since the setting screw 9 for securing the SLA 2 is not used, the breakage of the SLA 2 by the screw 9 can be prevented.

The contraction/extension of the SLA 2 can be compensated by a margin MG between the two retaining member 6B and 6C and the elastic member 7, causing an effect to be obtained that the intervals $l_1$ and $l_2$ to be always be maintained at a constant value.

That is, the reference surface of a projection 6BB of the supporting member 6B is positioned in contact with the light incidental surface of the SLA 2, causing the movement of the SLA 2 toward a glass 4 to be restricted.

Furthermore, a reference surface 6CC of the supporting member 6C and the light emitting surface of the SLA 2 are positioned in contact with each other, causing the movement of the SLA 2 toward the sensor 1 to be restricted.

As described above, the compensating operation is performed in the case where the SLA 2 is extended. In another case where the SLA 2 is contracted, the retaining members 6B and 6C are brought closer to each other by the pressure of the elastic member 7. The margin MG compensates the contraction of the SLA.

Figure 6:
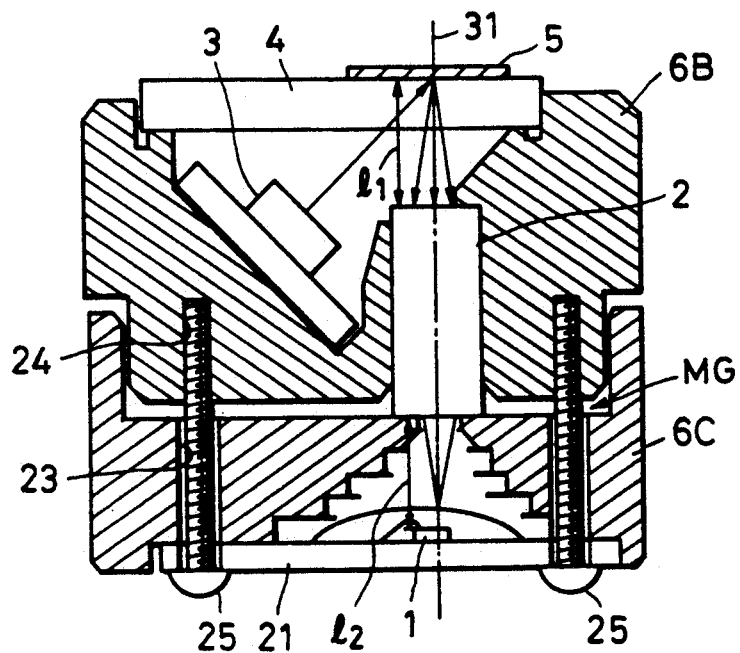
FIG. 6 is a schematic cross sectional view which illustrates another embodiment of the contact-type image sensor according to the present invention.

FIG. 6 illustrates another embodiment of the present invention. In this embodiment, the case 6A is omitted, through holes 23 are formed in the sensor supporting frame 21 and the sensor supporting member 6C, thread holes 24 are formed in the SLA supporting member 6B at positions corresponding to the positions of the through holes 23 and fixing screws 25 are inserted to secure the aforesaid elements. According to this embodiment, the number of the required elements can be decreased as compared with the first embodiment.

Also in this embodiment, 11 and 12 can be maintained at a constant distance. That is, the contraction/extension of the SLA 2 can be compensated by adjusting the screw 25.

As described above, according to this embodiment, the first supporting member for maintaining the distance from the top surface of the original-document retainer to the surface of the incidental side of the equal magnification imaging lens at a distance, and a second supporting member positioned in contact with the surface of the emission side of the equal magnification imaging lens and capable of maintaining the distance from the surface of the emission side to the light receiving surface of the line sensor at the aforesaid distance can be integrally coupled to each other while positioning the light receiving surface of the line sensor on the optical axis of the equal magnification imaging lens. Therefore, even if the dimension of the equal magnification imaging lens in the direction of its optical direction is changed in each manufacturing lot, the focal point adjustment operation for making the distance from the surface of the original document to the surface of the incident side of the equal-magnification imaging lens and the distance from the surface of the emission side of the equal-magnification imaging lens and the top surface of the line sensor to be the same can be eliminated. Furthermore, the assembling process can be simplified significantly and the deterioration in the quality of the image due to stray light and the breakage of the equal magnification imaging lens due to the setting screw can be prevented.

As the light sensor 1, it is preferable that a long photosensor of a type disclosed in U.S. Pat. No. 4,461,956 granted to Hatanaka and others, inventors, and comprising a photoelectric conversion layer made of amorphous silicon be employed because of its low price and excellent resolution.

It is preferable to use a photosensor of a type disclosed in U.S. Pat. No. 4,791,469 granted to Ohmi and others, inventors, and U.S. Pat. No. 4,810,896 granted to Tanaka and others, inventors, and arranged to provide a capacitive load connected with the emitter of a bipolar transistor to read an output signal from the emitter with voltage across the capacitive load.

Figure 7:
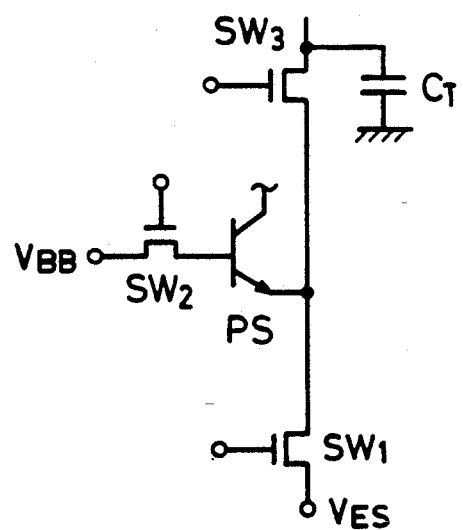
FIG. 7 is a circuit diagram which illustrates one pixel of the image sensor according to the present invention.

FIG. 7 illustrates an equivalent circuit which corresponds to one pixel of the sensor 1 according to the present invention.

Referring to FIG. 7, symbol PS represents a bipolar transistor which forms a pixel, $SW_1$ represents an nMOS transistor serving as a switch means for performing a resetting operation by connecting the emitter to a reference voltage source $V_{ES}$. Symbol $SW_2$ represents a pMOS transistor serving as a switch means for performing a resetting operation by connecting the base to a reference voltage source $V_{BB}$. Symbol $SW_3$ represents an nMOS transistor serving as a switch means for transferring the change of the signal and $C_T$ represents a capacitive load in which the voltage of the signal is generated.

Resetting Operation:

First, negative pulse voltage is applied to the gate of the pMOS transistor SW$_2$, so that the base is clamped to the voltage $V_{BB}$.

Although the aforesaid first and second embodiments are described about the charge storage and amplifying type image sensor which uses the bipolar transistor, the present invention may preferably be embodied in sensors of a type which has a light receiving portion made of light diode and in which the charge of the signal is transferred by an MOS switch or a charge coupled device (CCD) or the like.

Figure 8:
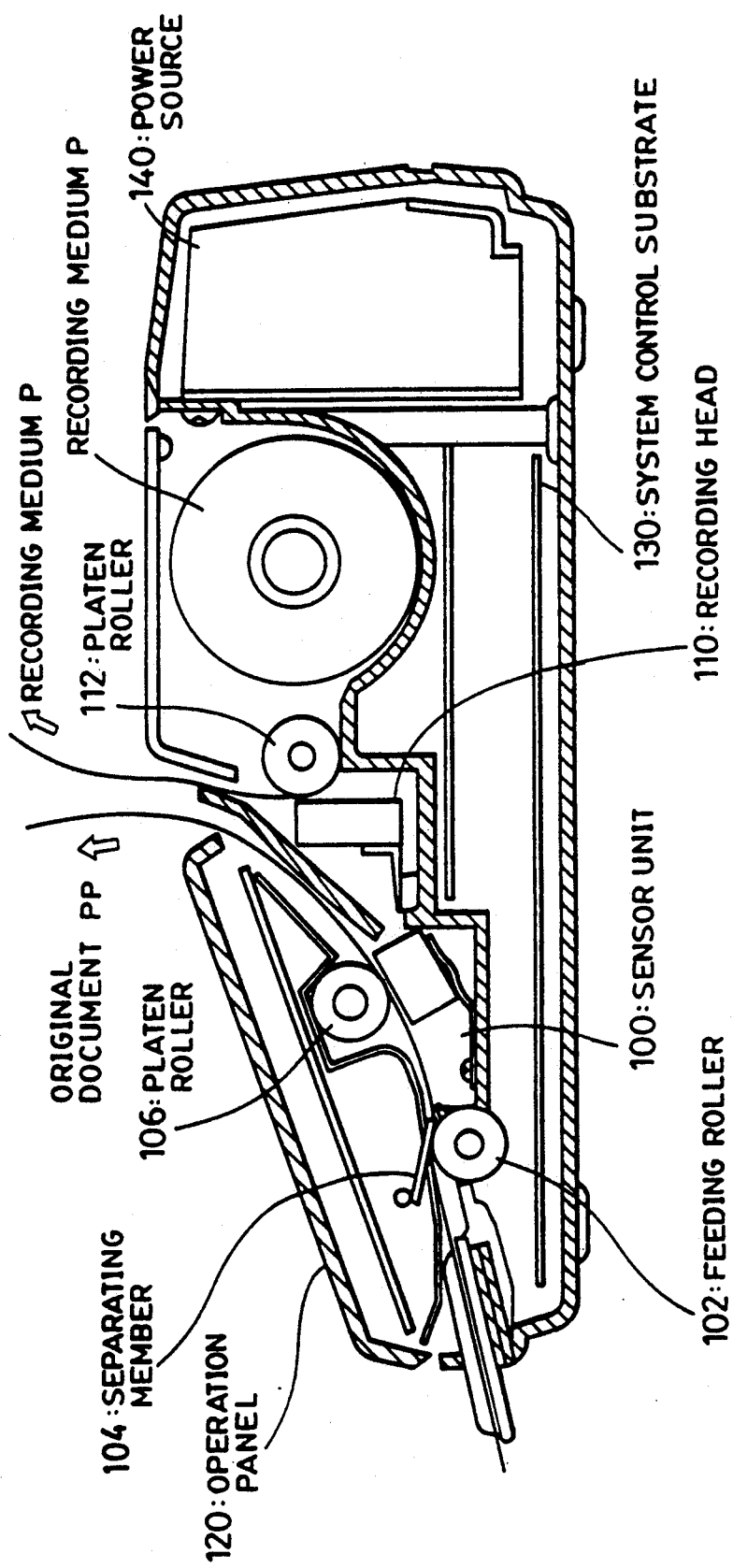
FIG. 8 is a schematic cross sectional view which illustrates an information processing apparatus on which the contact-type image sensor according to the present invention is mounted.

FIG. 8 illustrates an example of a facsimile machine serving as the image processing processing apparatus formed by using the contact-type image sensor assembly and having a communicating function. Referring to FIG. 8, reference numeral 102 represents a feeding roller serving as a feeding means for feeding original document PP to a reading position. Reference numeral 104 represents a separating member for reliably separating an individual original document PP to feed it. Reference numeral 106 represents a platen roller disposed to correspond to the position at which the sensor assembly reads the original document PP to restrict the surface of the original document PP to be read and serving as a conveying means for conveying the original document PP.

Symbol P represents a recording medium formed into a roll paper on which image information read by the sensor assembly or, in a case of the facsimile apparatus or the like, image information transmitted from outside, is reproduced. Reference numeral 110 represents a recording head serving as a recording means for use to form the aforesaid image and may be a thermal head, or an ink jet recording head, or the like. The aforesaid recording head may be either a serial type recording head or a line type recording head. Reference numeral 112 represents a platen roller serving as a conveying means for conveying the recording medium P to a position at which the recording head 110 records image information and restricting the surface of the recording medium P to be recorded.

Reference numeral 120 represents an operation panel having switches serving as input/output means for receiving input operations, and display portion for displaying messages and the status of the apparatus, and the like.

Reference numeral 130 represents a system control substrate serving as a control means having a control portion (controller) for controlling each unit, a drive circuit (a driver) for driving a photoelectrically converting device, an image information processing portion (a processor) and an information transmitting/receiving portion and the like. Reference numeral 140 represents a power source of the apparatus.

It is preferable that the recording means for use in the information processing apparatus according to the present invention be a recording means of a type the Then, Positive pulse voltage is applied to the gate of the nMOS transistor SW$_1$, so that the emitter is connected to the voltage source $V_{ES}$ and thereby an electric current flows between the base and the emitter. As a result, a light generating carrier stored in the base is extinguished.

Storage Operation:

Both of the nMOS transistors SW$_1$ and SW$_3$ are turned off, causing both of the emitter and the base to be brought into the floating state. As a result, the storage operation is commenced.

Reading Operation:

Then, positive pulse voltage is applied to the gate of the nMOS transistor SW$_3$, so that SW$_3$ is switched on, causing the emitter and the capacitance CT to be connected to each other. As a result, the portion between the base and the emitter are biased forward and the voltage of the signal is read out in the capacitance CT.

The basic structure of an image sensor of the aforesaid type has been disclosed in U.S. Pat. No. 4,686,554 granted to Ohmi and Tanaka, inventors, and arranged as an excellent sensitive and low noise photoelectrically converting apparatus of a charge storage type in which the emitter of a bipolar transistor is connected to an output circuit including a capacity load. typical structure and the principle of which have been disclosed in U.S. Pat. No. 4,323,129 and U.S. Pat. No. 4,740,796. The aforesaid structure is arranged in this way that electrothermal converting members disposed to correspond to a sheet or a liquid passage which holds liquid (ink) are applied with one or more drive signal which rapidly raise the temperature of the electrothermal converting members to a level higher than the nuclear boiling level. As a result, heat energy is generated in the electrothermal converting member to cause the film boiling to take place in the surface of the recording head which receives heat. Therefore, an effect can be obtained in that bubble can be formed in liquid (ink) corresponding to each drive signal. When the bubble is enlarged and contracted, liquid (ink) is discharged through a discharge port, so that one or more droplets are formed.

As the full line type recording head having a length which is the same as the width of the maximum recording medium adapted to the recording apparatus, a structure may be employed which has the length realized by combining a plurality of the recording heads disclosed in the aforesaid specifications or an integrated type single recording head may be employed.

The present invention may be effectively embodied in a structure which uses an interchangeable chip type recording head which is mounted on the apparatus body and which enables, in this state, an electrical connection with the apparatus body to be established and ink to be supplied or a structure which uses a cartridge type recording head formed by integrally forming an ink tank with the recording head.

What is claimed is:

1. A contact-type image sensor assembly comprising:
   an image sensor;
   a light source for illuminating an original document which has image information;
   an optical lens for imaging light reflected by said original document onto said image sensor; and
   supporting means for supporting said image sensor, said light source, and said optical lens, wherein said supporting means comprises:
   a first supporting member for supporting the surface of said original document at a predetermined distance from the light incidental side of said optical lens;

a second supporting member disposed separately from said first supporting member for supporting the light emission side of said optical lens at a predetermined distance from the light receiving side of said image sensor; and a third supporting member for supporting said first and second supporting members at predetermined positions, wherein a predetermined space is formed between said light emission side of said optical lens and said light receiving side of said image sensor, and wherein said third supporting member supports said first and second supporting members so that their relative positions can be varied.

2. A contact-type image sensor assembly according to claim 1, wherein said third supporting member comprises a housing and an elastic member, said housing surrounding said second supporting member.

3. A contact-type image sensor assembly according to claim 1, wherein said third supporting member is a screw.

4. A contact-type image sensor assembly according to claim 1, wherein said image sensor includes an emitter-follower transistor circuit having a capacitor load.

5. A contact-type image sensor assembly according to claim 1, wherein said image sensor includes a photoelectrically converting layer made of amorphous silicon.

6. A contact-type image sensor assembly comprising:
an image sensor
a light source for illuminating an original document which has image information;
an optical lens for imaging light reflected by said original document onto said image sensor; and
a supporting member, said supporting member comprising:
a first supporting portion having a first reference surface which is in contact with the light incidental side of said optical lens;
a second supporting portion having a second reference surface which is in contact with the light emission side of said optical lens; and
a third supporting portion for supporting said first and second supporting portions so that the relative positions of said first and second supporting portions can be varied in accordance with the length of said optical lens.

7. An image forming processing system comprising:
an image sensor;
a light source for illuminating an original document which has image information;
an optical lens for imaging light reflected by said original document onto said image sensor; and
a supporting member, wherein said supporting member comprises:
a first supporting portion having a first reference surface which is in contact with the light incidental side of said optical lens;
a second supporting portion having a second reference surface which is in contact with the light emission said of said optical lens; and
a third supporting portion for supporting said first and second supporting portions so that the relative positions of said first and second supporting portions can be varied in accordance with the length of said optical lens;
an original document supporting means for supporting an original document having image information at a position at which said image sensor assembly reads image information; and recording means for recording image information read by said image sensor assembly.

8. An image information processing system according to claim 7, wherein said recording means is a recording head for recording image information by discharging ink by utilizing heat energy.

9. An image information processing system comprising:
an image sensor;
a light source for illuminating an original document which has image information;
an optical lens for imaging light reflected by said original document onto said image sensor; and
supporting means for supporting said image sensor, said light source, and said optical lens, wherein said supporting means comprises:
a first supporting member for supporting the surface of said original document at a predetermined distance from the light incidental side of said optical lens;
a second supporting member disposed separately from said first supporting member, for supporting the light emission side of said optical lens at a predetermined distance from the light receiving side of said image sensor; and
a third supporting member for supporting said first and second supporting members at predetermined positions, wherein a predetermined space is formed between said light emission side of said optical lens and said light receiving side of said image sensor, and wherein said third supporting member supports said first and second supporting members so that their relative positions can be varied;
original document supporting means for supporting an original document having image information at a position at which said image sensor assembly reads image information; and
recording means for recording image information read by said image sensor assembly.

10. An image information processing system according to claim 9, wherein said recording means comprises a recording head for recording image information by discharging ink by utilizing thermal energy.

11. A contact-type image sensor assembly comprising:
an image sensor;
a light source for illuminating an original document which has image information;
an optical lens for imaging light reflected by said original document onto said image sensor; and
supporting means for supporting said image sensor, said light source and said optical lens, wherein said supporting means includes:
first reference means for restricting movement of said optical lens toward said original document so as to maintain the distance from a surface of said original document to the light incidental side of said optical lens at a predetermined distance;
second reference means for restricting movement of said optical lens toward said image sensor so as to maintain the distance from the light emission side of said optical lens to the light receiving side of said image sensor; and
a supporting member for supporting said first and second reference means at predetermined position, said supporting member supporting said first and second reference means so that their relative positions can be varied.

12. A contact-type image sensor assembly according to claim 11, wherein said supporting member has a housing and an elastic member, said housing including said second supporting member.

13. A contact-type image sensor assembly according to claim 11, wherein said supporting member comprises a screw.

14. A contact-type image sensor assembly according to claim 11, wherein said image sensor includes an emitter-follower transistor circuit having a capacitor as a load.

15. A contact-type image sensor assembly according to claim 11, wherein said image sensor includes a photoelectrical converting layer comprising amorphous silicon.

16. A contact-type image sensor assembly according to claim 6, wherein said third supporting portion has a housing and an elastic member, said housing including said second supporting portion.

17. A contact-type image sensor assembly according to claim 6, wherein said third supporting portion comprises a screw.

18. A contact-type image sensor assembly according to claim 6, wherein said image sensor includes an emitter-follower transistor circuit having a capacitor as a load.

19. A contact-type image sensor assembly according to claim 6, wherein said image sensor includes a photoelectrical converting layer comprising amorphous silicon.

20. An image processing system comprising:
an image sensor;
a light source for illuminating an original document which has image information;
an optical lens for imaging light reflected by said original document onto said image sensor; and
supporting means for supporting said image sensor, said light source and said optical lens, wherein said supporting means includes:
first reference means for restricting movement of said optical lens toward said original document so as to maintain the distance from a surface of said original document to the light incidental side of said optical lens at a predetermined distance;
second reference means for restricting movement of said optical lens toward said image sensor so as to maintain the distance from the light emission side of said optical lens to the light receiving side of said image sensor; and
a supporting member for supporting said first and second reference means at predetermined position, said supporting member supporting said first and second reference means so that their relative positions can be varied;
original document supporting means for supporting an original document having image information at a position at which said image sensor assembly reads image information therefrom; and
recording means for recording image information read by said image sensor assembly.

21. An image information processing system according to claim 20, wherein said recording means comprises a recording head for recording image information by discharging ink by utilizing thermal energy.

* * * * *

UNITED STATES PATENT AND TRADEMARK OFFICE
CERTIFICATE OF CORRECTION

PATENT NO. : 5,254,847
DATED : October 19, 1993
INVENTOR(S) : FUMIO HATA ET AL.

It is certified that error appears in the above-identified patent and that said Letters Patent is hereby corrected as shown below:

ON THE TITLE PAGE

AT [54] TITLE

"DISTANCE" should read --DISTANCES--.

AT [56] FOREIGN PATENT DOCUMENTS insert, -- 1-089756   4/1989   Japan
           3-064714   3/1991   Japan
           59-181771  10/1984  Japan
           61-035062  2/1986   Japan
           63-303560  12/1988  Japan--.

COLUMN 1

Line 4, "DISTANCE" should read --DISTANCES--.
Line 22, "receiver" should read --receive--.

COLUMN 3

Line 57, "will be appear" should read --will appear--.
Line 62, "cross sectional" should read --cross-sectional--.

UNITED STATES PATENT AND TRADEMARK OFFICE
CERTIFICATE OF CORRECTION

PATENT NO. : 5,254,847
DATED : October 19, 1993
INVENTOR(S) : FUMIO HATA ET AL.

It is certified that error appears in the above-identified patent and that said Letters Patent is hereby corrected as shown below:

COLUMN 4

Line 4, "cross sectional" should read --cross-sectional--.
Line 7, "cross sectional" should read --cross-sectional--.
Line 13, "cross sectional" should read --cross-sectional--.
Line 26, "arrangement" should read --arrangements--.
Line 50, "so, and" should read --so--.

COLUMN 5

Line 3, "distance $1_1$" should read --distance $\ell_1$--.
Line 7, "distance $1_2$" should read --distance $\ell_2$--.
Line 26, "claw G" should read --claw 6G--.
Line 52, "member" (first occurrence) should read --members--.
Line 53, "intervals $1_1$ and $1_2$" should read --intervals $\ell_1$ and $\ell_2$--.

COLUMN 6

Line 13, "11 and 12" should read --$\ell_1$ and $\ell_2$--.
Line 46, "others, inventors," should read --other inventors,--.
Line 52, "others, inventors," should read --other inventors,--.
Line 53, "others, inventors," should read --other inventors,--.

UNITED STATES PATENT AND TRADEMARK OFFICE
CERTIFICATE OF CORRECTION

PATENT NO.  : 5,254,847
DATED       : October 19, 1993
INVENTOR(S) : FUMIO HATA ET AL.           Page 3 of 6

It is certified that error appears in the above-identified patent and that said Letters Patent is hereby corrected as shown below:

COLUMN 7

Lines 9-62 should be deleted.
    Line 18, "processing processing" should read
        --processing--.
    Line 63, "Positive" should read --positive--.

COLUMN 8

Line 21, "load. typical" should read
    --load.
        Although the aforesaid first and second embodiments are described about the charge storage and amplifying type image sensor which uses the bipolar transistor, the present invention may preferably be embodied in sensors of a type which has a light receiving portion made of light diode and in which the charge of the signal is transferred by an MOS switch or a charge coupled device (CCD) or the like.
        FIG. 8 illustrates an example of a facsimile machine serving as the image processing apparatus formed by using the contact-type image sensor assembly and having a communicating function. Referring to FIG. 8, reference numeral 102 represents a feeding roller serving as a feeding means for feeding original document PP to a reading position. Reference numeral 104 represents a separating member for reliably separating an individual

UNITED STATES PATENT AND TRADEMARK OFFICE
CERTIFICATE OF CORRECTION

PATENT NO.  : 5,254,847

DATED       : October 19, 1993

INVENTOR(S) : FUMIO HATA ET AL.

It is certified that error appears in the above-identified patent and that said Letters Patent is hereby corrected as shown below:

COLUMN 8

Line 21, continued,
original document PP to feed it. Reference numeral 106 represents a platen roller disposed to correspond to the position at which the sensor assembly reads the original document PP to restrict the surface of the original document PP to be read and serving as a conveying means for conveying the original document PP.

Symbol P represents a recording medium formed into a roll paper on which image information read by the sensor assembly or, in a case of the facsimile apparatus or the like, image information transmitted from outside, is reproduced. Reference numeral 110 represents a recording head serving as a recording means for use to form the aforesaid image and may be a thermal head, or an ink jet recording head, or the like. The aforesaid recording head may be either a serial type recording head or a line type recording head. Reference numeral 112 represents a platen roller serving as a conveying means for conveying the recording medium P to a position at which the recording head 110 records image information and restricting the surface of the recording medium P to be recorded.

UNITED STATES PATENT AND TRADEMARK OFFICE
CERTIFICATE OF CORRECTION

PATENT NO. : 5,254,847
DATED : October 19, 1993
INVENTOR(S) : FUMIO HATA ET AL.

It is certified that error appears in the above-identified patent and that said Letters Patent is hereby corrected as shown below:

COLUMN 8

Line 21, continued,
Reference numeral 120 represents an operation panel having switches serving as input/output means for receiving input operations, and display portion for displaying messages and the status of the apparatus, and the like.
Reference numeral 130 represents a system control substrate serving as a control means having a control portion (controller) for controlling each unit, a drive circuit (a driver) for driving a photoelectrically converting device, an image information processing portion (a processor) and an information transmitting/receiving portion and the like. Reference numeral 140 represents a power source of the apparatus.
It is preferable that the recording means for use in the information processing apparatus according to the present invention be a recording means of a type the typical--.

Line 23, "4,323,129" should read --4,723,129--.
Line 27, "signal" should read --signals--.
Line 34, "bubble" should read --a bubble--.

UNITED STATES PATENT AND TRADEMARK OFFICE
CERTIFICATE OF CORRECTION

PATENT NO.  : 5,254,847
DATED       : October 19, 1993
INVENTOR(S) : FUMIO HATA ET AL.

It is certified that error appears in the above-identified patent and that said Letters Patent is hereby corrected as shown below:

<u>COLUMN 9</u>

Line 28, "sensor" should read --sensor;--.

Signed and Sealed this

Fifteenth Day of November, 1994

Attest:

BRUCE LEHMAN

Attesting Officer     Commissioner of Patents and Trademarks